Figure 1:
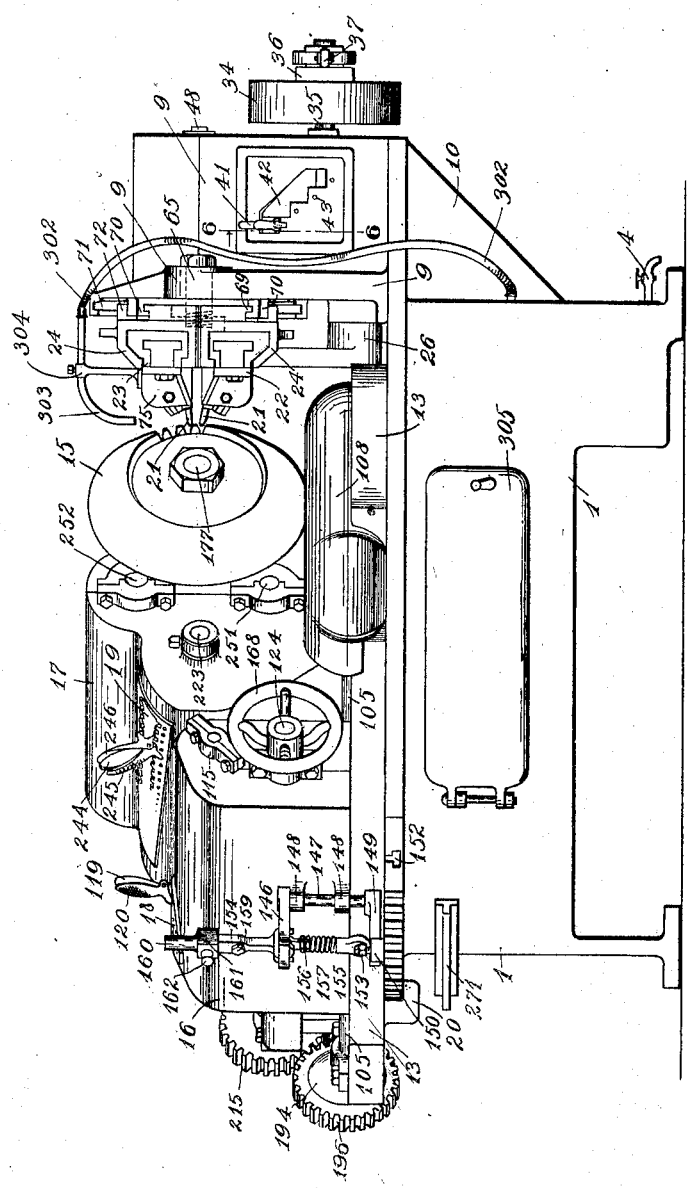

E. H. BROWNING.
MACHINE FOR CUTTING BEVEL GEARS.
APPLICATION FILED MAY 7, 1907.

1,040,137.

Patented Oct. 1, 1912
10 SHEETS—SHEET 1.

WITNESSES:

INVENTOR,
Earl H. Browning.
By Bates, Fouts & Hull,
ATTYS.

E. H. BROWNING.
MACHINE FOR CUTTING BEVEL GEARS.
APPLICATION FILED MAY 7, 1907.
1,040,137.
Patented Oct. 1, 1912.
10 SHEETS—SHEET 2.
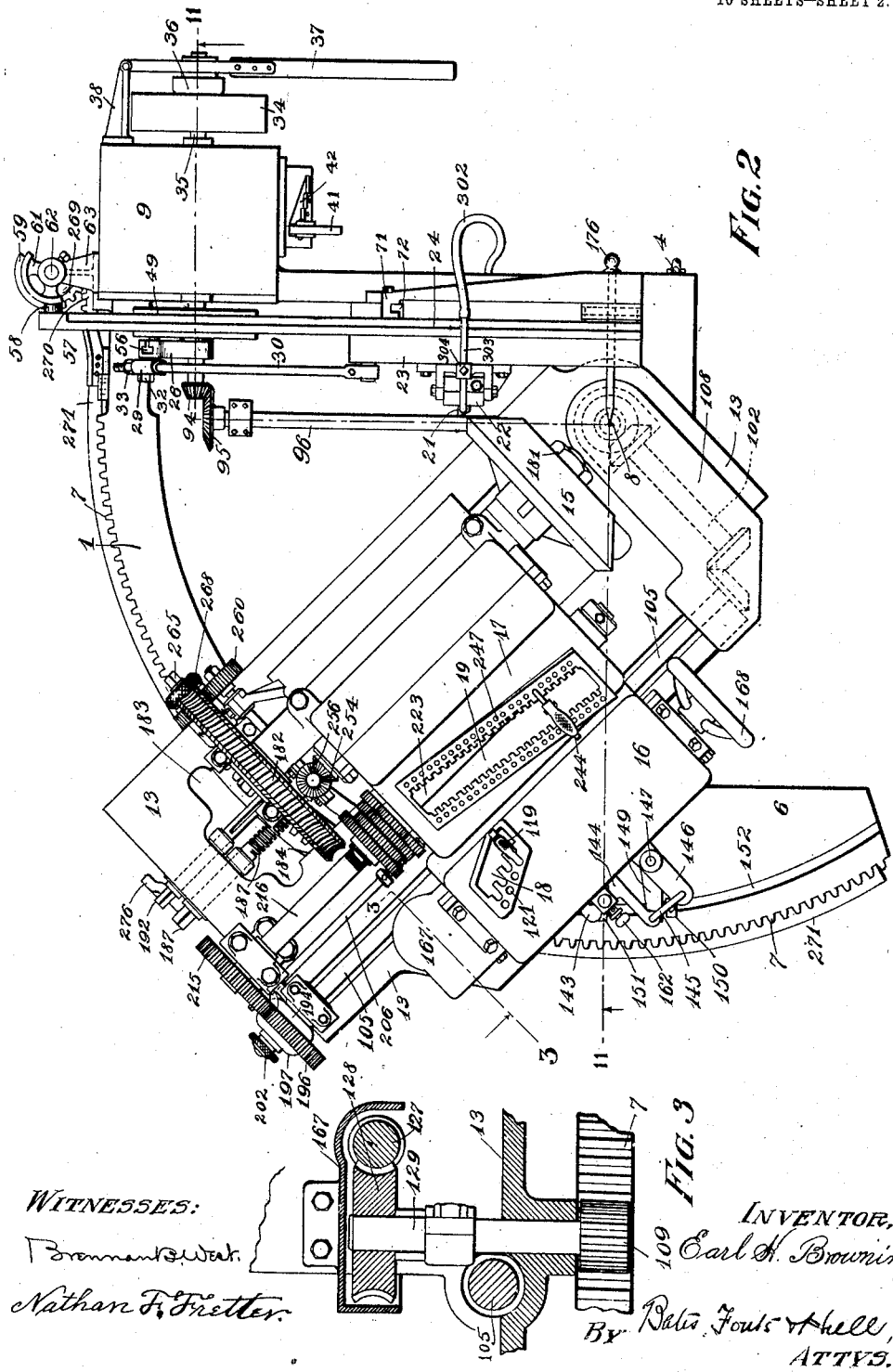

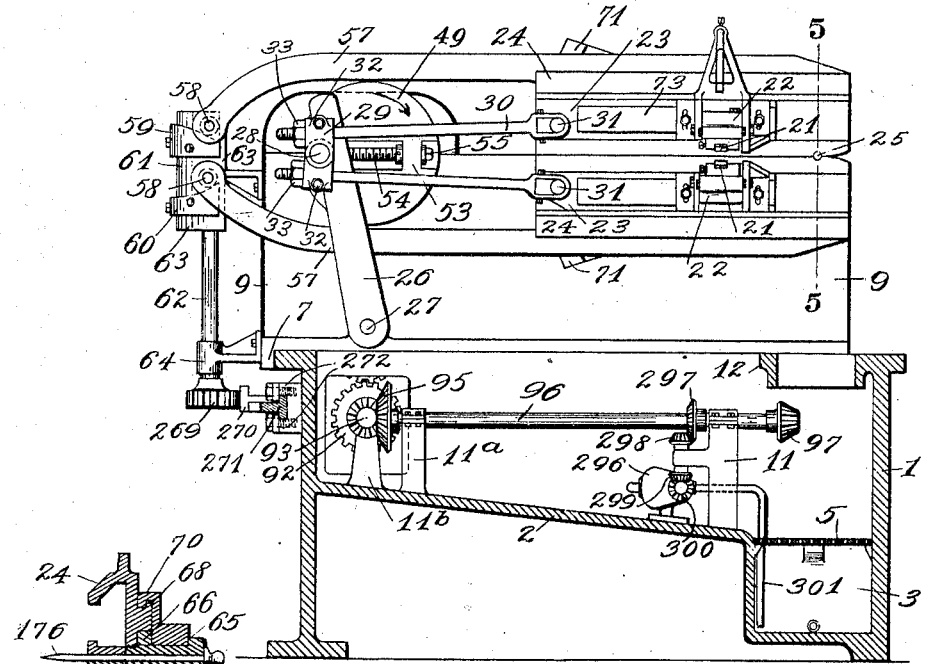

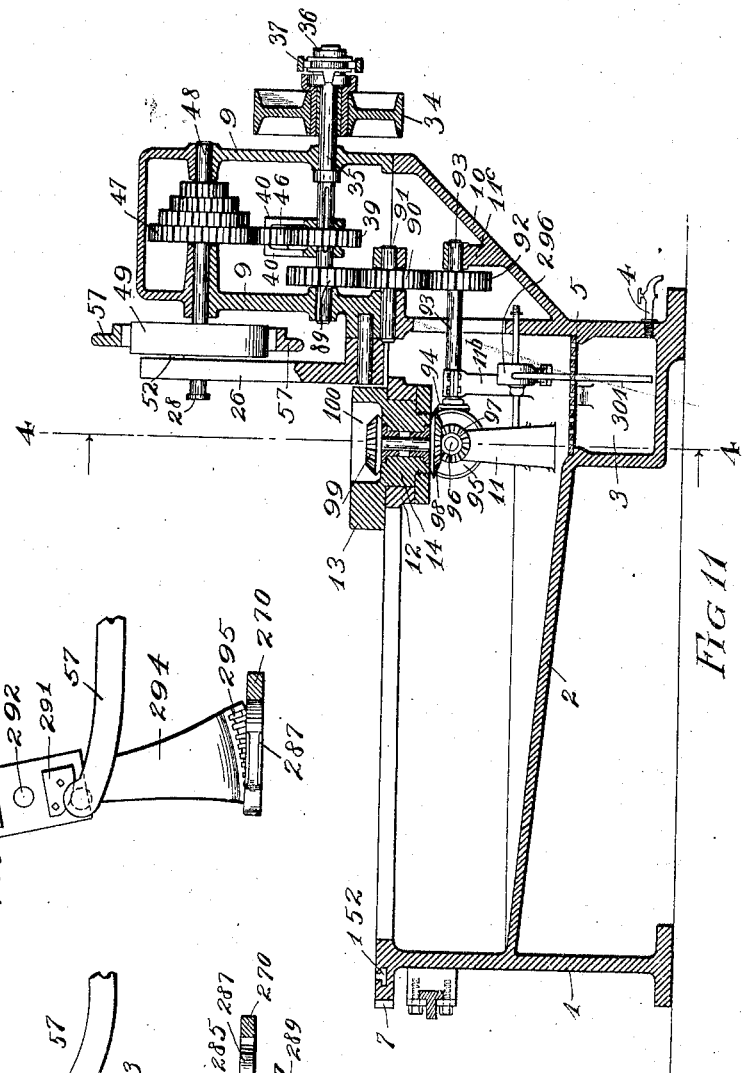

E. H. BROWNING.
MACHINE FOR CUTTING BEVEL GEARS.
APPLICATION FILED MAY 7, 1907.
1,040,137.
Patented Oct. 1, 1912.
10 SHEETS—SHEET 5.
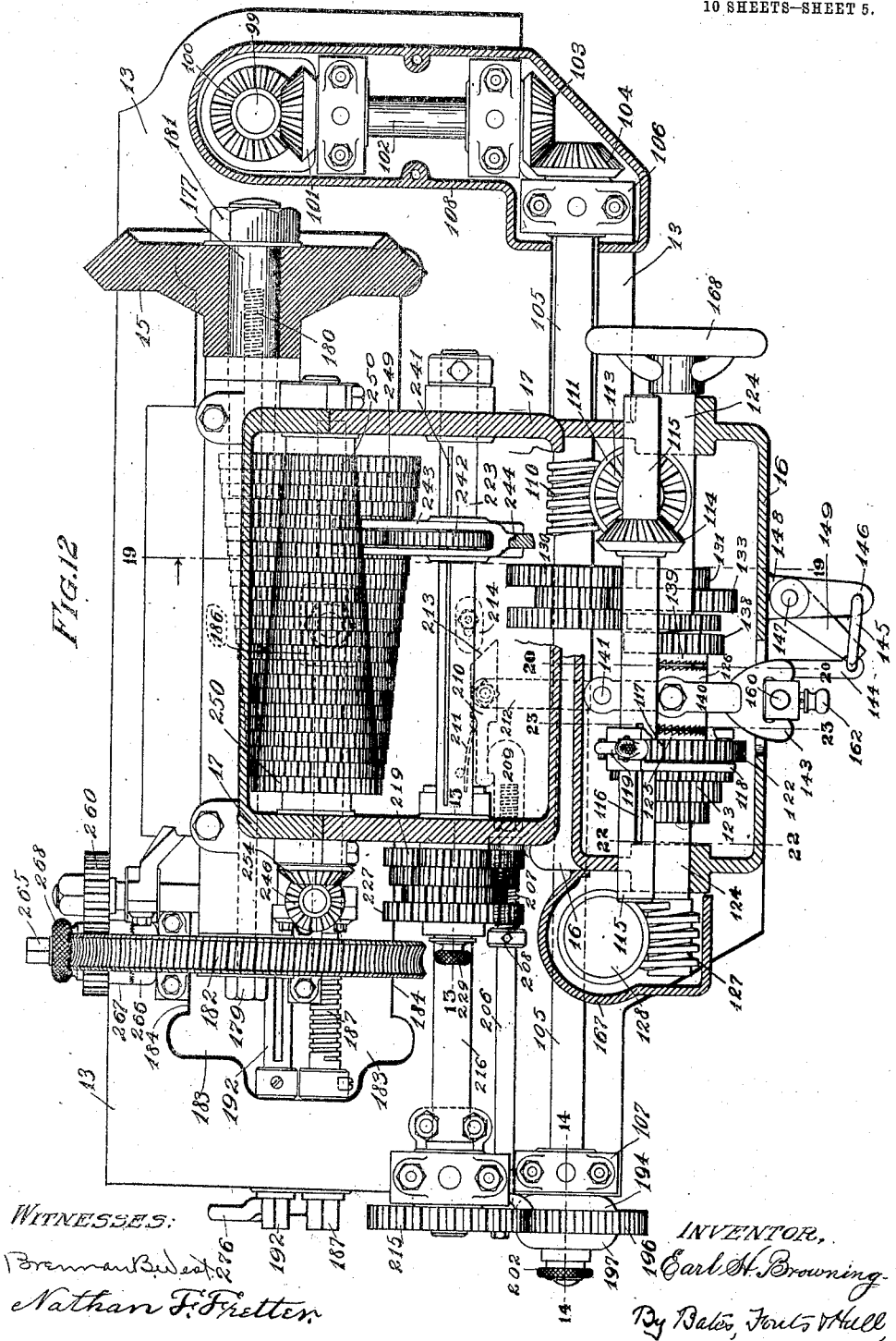
WITNESSES:
Brennan Budest
Nathan F. Fretter
INVENTOR,
Earl H. Browning.
By Bates, Fouts & Hull,
ATTYS.

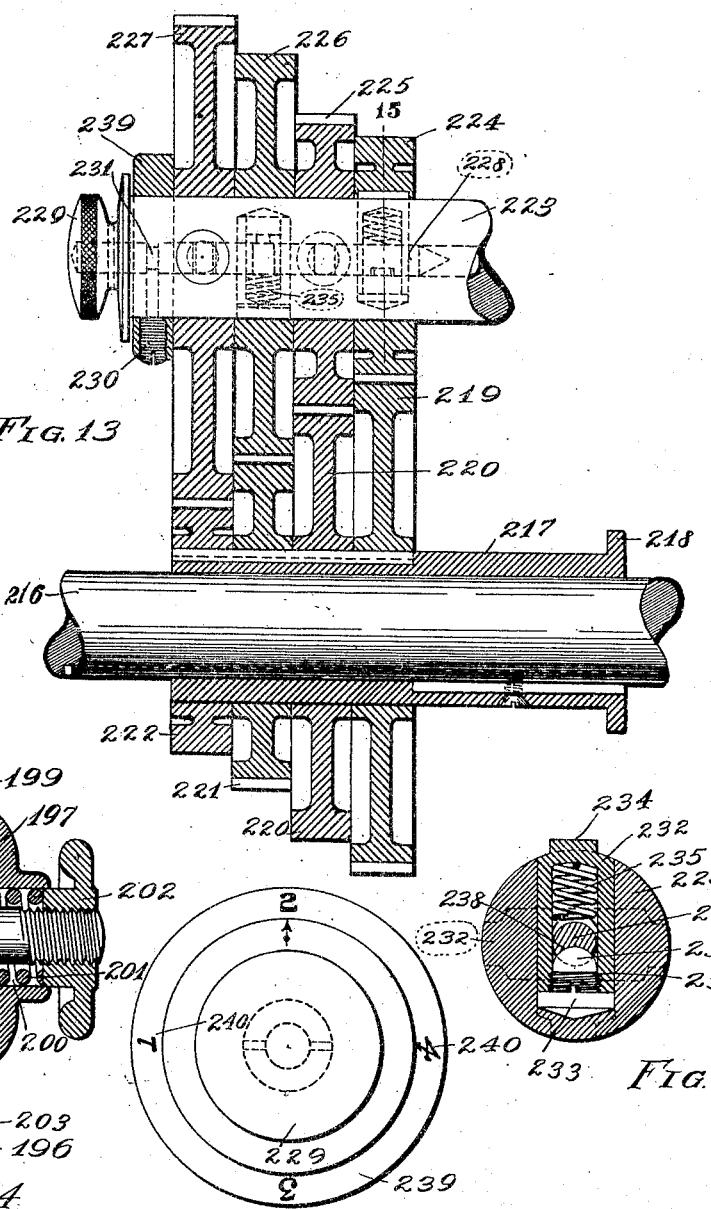

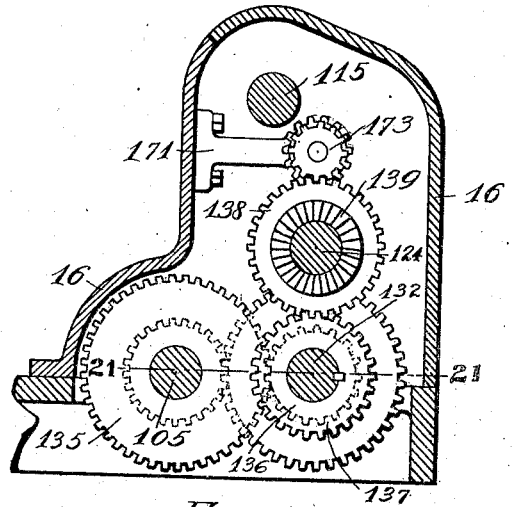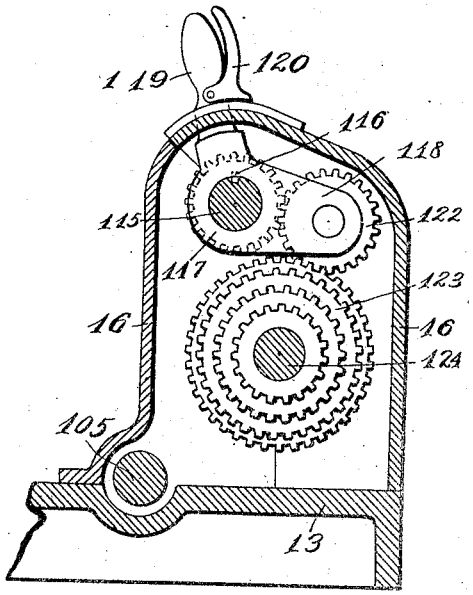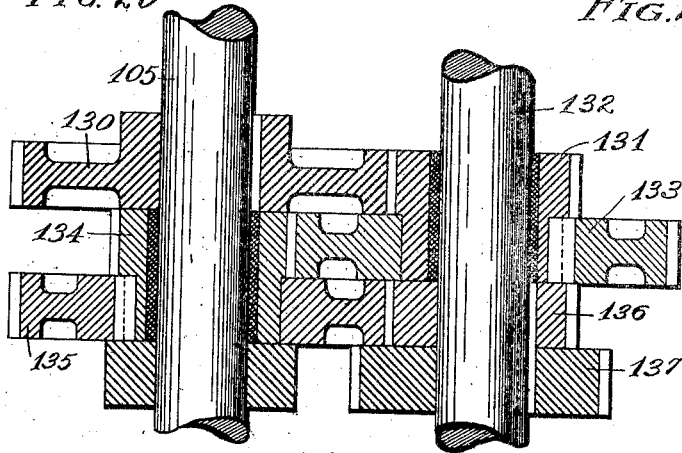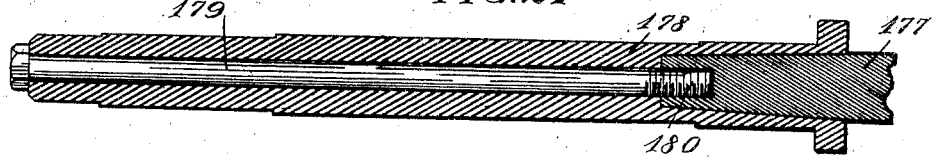

E. H. BROWNING.
MACHINE FOR CUTTING BEVEL GEARS.
APPLICATION FILED MAY 7, 1907.

1,040,137.

Patented Oct. 1, 1912.
10 SHEETS—SHEET 9.

WITNESSES:
Brennan B. West.
Nathan F. Fretter.

INVENTOR,
Earl H. Browning
BY Bates, Fouts & Hull,
ATTYS.

E. H. BROWNING.
MACHINE FOR CUTTING BEVEL GEARS.
APPLICATION FILED MAY 7, 1907.

1,040,137.

Patented Oct. 1, 1912.

10 SHEETS—SHEET 10.

WITNESSES:
Brennan B. West.
Nathan F. Fretter.

INVENTOR.
Earl H. Browning.
By Bates, Fouts & Hull,
ATTYS.

UNITED STATES PATENT OFFICE.

EARL H. BROWNING, OF NOTTINGHAM, OHIO.

MACHINE FOR CUTTING BEVEL-GEARS.

1,040,137.   Specification of Letters Patent.   Patented Oct. 1, 1912.

Application filed May 7, 1907. Serial No. 372,375.

*To all whom it may concern:*

Be it known that I, EARL H. BROWNING, a citizen of the United States, residing at Nottingham, in the county of Cuyahoga and State of Ohio, have invented a certain new and useful Improvement in Machines for Cutting Bevel-Gears, of which the following is a full, clear, and exact description, reference being had to the accompanying drawings.

This invention relates to machines for cutting bevel gears, and it has for its object the provision of means for feeding the gear blank toward and from the cutting tool; the provision of means for regulating the speed with which the said gear blank is thus fed; the provision of automatic means for reversing the direction of the feeding motion of said gear blank and for feeding the latter away from the tool at a higher rate of speed than the same is fed toward the tool; the provision of means for automatically turning the gear blank so as to present a new tooth to the cutting tool, said means being capable of change so as to turn the gear blank a greater or less distance according to the number of teeth to be cut on the blank; the provision of a pair of cutting tools so that both sides of a tooth may be simultaneously operated upon; the provision of improved means for holding and operating the cutting tools; the provision of an improved form of templet operating devices for controlling the operation of the cutting tools, and the provision of means for varying the speed of operation of the various parts of the machine. These and other improvements are so combined and constructed as to produce a machine of the character specified that will be of great simplicity of construction and operation and that will possess sufficient strength for the purpose for which it is intended.

Figure 18:
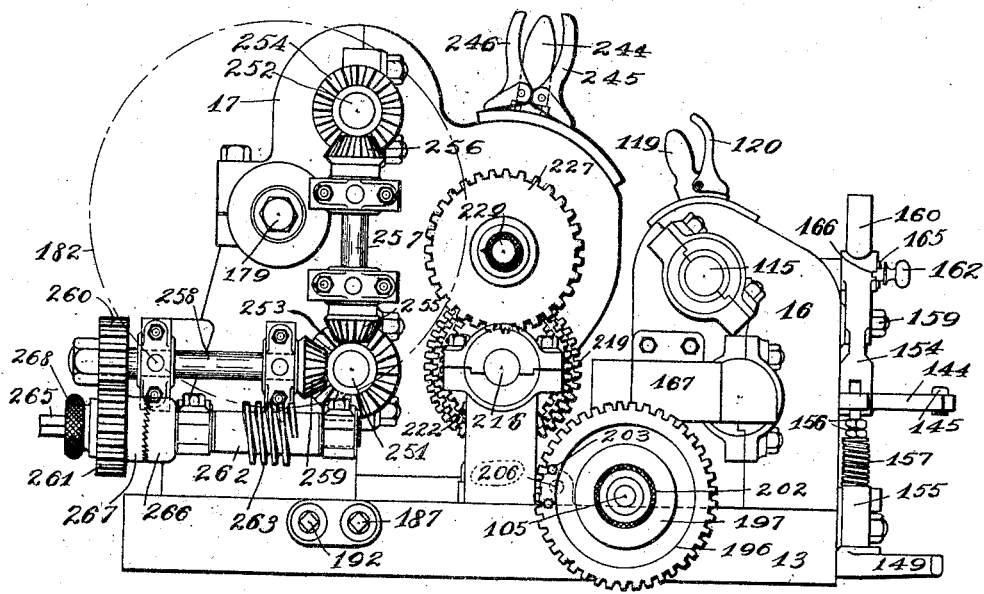
Figure 19:
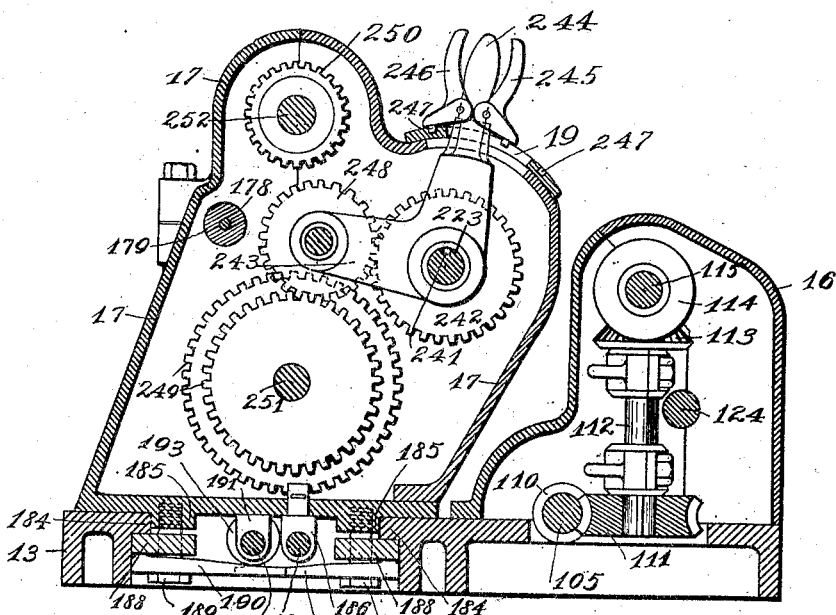
Figure 24:
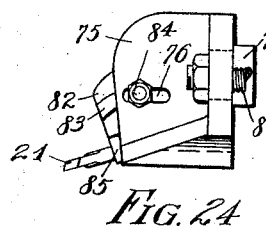
Figure 25:
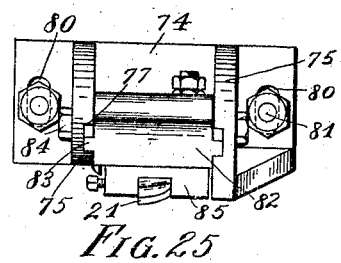
Figure 23:
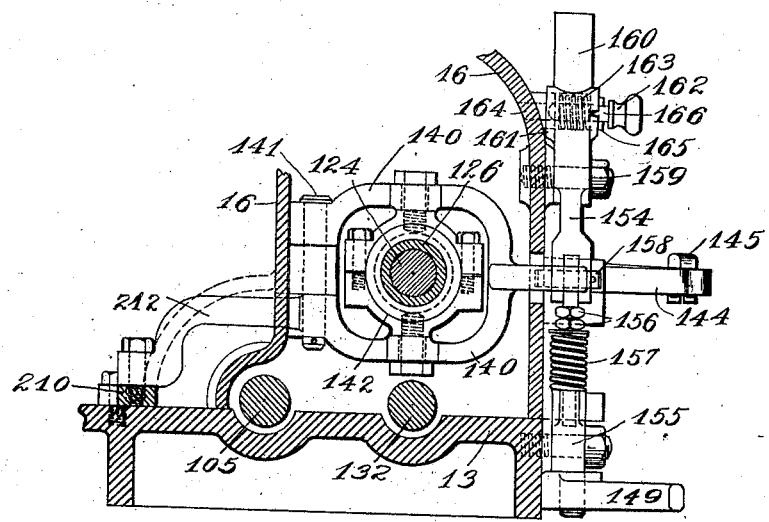

In the drawings forming a part of this application, Figure 1 is a front elevation of my invention showing a gear blank in position for being cut; Fig. 2 is a top plan view of the invention with the said gear blank in position; Fig. 3 is a sectional view taken through Fig. 2 on the line 3—3, and showing the traveling pinion for turning the table; Fig. 4 is a vertical section through Fig. 11 taken on the line 4—4 thereof and looking in the direction of the arrows; Fig. 5 is a vertical section taken on the line 5—5 of Fig. 4; Fig. 6 is a section taken on the line 6—6 of Fig. 1; Fig. 7 is a view of a detail, partly in section and partly in elevation, showing the means for clamping the rack-operating bar for turning the templets; Figs. 8 and 9 are a front elevation and central transverse section respectively of the crank disk for moving the cutting tools; Fig. 10 is a perspective view of the lever that is operated by the crank disk for moving the cutting tools; Fig. 11 is a section taken on the broken line 11—11 of Fig. 2 and looking in the direction of the arrows, the swinging table being removed; Fig. 12 is a top plan view of the swinging table and the mechanism thereon, the casings therefor being broken away in part so as to show the construction and arrangement of the parts; Fig. 13 is a section through the change of speed gears for turning the gear blank, the same being taken on the line 13—13 of Fig. 12; Fig. 14 is a section through the friction brake, said view being taken on the line 14—14 of Fig. 12; Fig. 15 is a sectional detail taken on the line 15—15 of Fig. 13; Fig. 16 is an elevation of the index plate connected with the change of speed gears shown in Fig. 13; Fig. 17 is a view of a detail; Fig. 18 is an elevation of the left hand end of the parts shown in Fig. 12 with the worm wheel and a large gear removed for clearness; Fig. 19 is a section through Fig. 12 on the line 19—19 looking in the direction of the arrow; Fig. 20 is a section taken on the line 20—20 of Fig. 12, some of the parts at the right being omitted for clearness in disclosure; Fig. 21 is a transverse section on the line 21—21 of Fig. 20, the parts being somewhat enlarged; Fig. 22 is a section on the line 22—22 of Fig. 12; Fig. 22ª is a view of the mandrel shaft and mandrel; Fig. 23 is a section on the line 23—23 of Fig. 12; Figs. 24, 25, 26 and 27 are detail views of the tool and the tool holder; Figs. 28 and 29 are modified forms of templets and the operating device therefor for controlling the operation of the cutting tools; Fig. 30 is a plan view of the double rack shown in Figs. 28 and 29; and Figs. 31, 32, 33 and 34 are detail views showing the means for providing a lost motion in the train of gears for moving the swinging table and the gear blank away from the cutting tools.

Taking up a detailed description of my invention by reference to the accompanying drawings, in which similar reference characters designate corresponding parts throughout the several views thereof, I shall first describe the frame.

*Frame.*—This frame, which is represented by 1, is a large casting forming the base of the machine, said casting being preferably open both above and below, and being divided near the center by a partition 2, said partition, as shown in Figs. 4 and 11, inclining toward the right hand corner of the frame in two directions, so as to form a wide trough or channel into which the drippings of oil from the upper part of the machine may fall and be directed into an oil receptacle 3 located near the said right hand corner at the bottom of the frame. This oil receptacle is provided with a spigot or cock 4 through which the oil may be drawn off if desired. At the top of said receptacle I provide a screen plate 5 through which the oil is strained so that all chippings and other solid matter is thus separated from the oil.

As will appear from Fig. 2 of the drawings, the frame is provided at its front and left hand side with a projection 6, so as to afford an extended part for a segmental rack 7 that is formed on a flange which projects from the rounded portion of the frame, it being understood, and as appears from Fig. 2, that the frame is rounded at its left and rear sides upon an arc having a point 8 for a center. At the right hand side of the frame, I provide a housing 9 for the driving mechanism, said housing being supported upon the main part of the frame and by a bracket structure 10 which rises from the frame near its base and extends at an angle upwardly and outwardly. Within the frame, at the rear of the point 8 hereinbefore referred to, there is an upright arm or bracket 11 projecting upwardly from the partition 2 and carrying a journal bearing for a drive shaft, hereinafter more specifically described. Other journal-bearing arms 11$^a$, 11$^b$ and 11$^c$ also project upwardly from the partition 2 at the rear of arm 11. Formed within the frame near the upper surface and surrounding the point 8 is a hollow boss 12, the same forming a pivot for the swinging table 13, now to be described.

*Swinging table.*—As appears from Figs. 2 and 12 of the drawing, this swinging table is approximately rectangular in plan view, one corner of the same being provided with an extended boss or journal 14 which fits within and has its bearing in the boss or journal 12 of the frame, so that the table may be swung on the said corner with the point 8 as its center. The table carries the mechanism for swinging itself on the frame, and also for turning the gear blank 15 so as to present different parts to the cutting tool. The mechanism for swinging the table is contained within a casing 16 on the table, while the mechanism for turning the gear blank is contained within a separate casing 17, also on said table. As appears from Fig. 2, the casing 16 is provided on its upper surface with a diagonal slot 18, and the casing 17 is provided with a similar slot 19, the purpose of said slots being hereinafter clearly set forth. The table 13 is held down on the base frame by L-shaped plates 20 that hook under the flange that carries the rack 7. (See Figs. 1 and 7).

*Cutting mechanism.*—For cutting the teeth I prefer to employ a pair of cutting tools 21 operating simultaneously on the two sides of a tooth, although it will be understood that a single cutting tool operating upon a single side of the tooth may be employed. As appears from Fig. 4, these cutting tools are mounted in suitable tool-holders 22, hereinafter more specifically described, said tool-holders being adjustably mounted in sliding frames or cross-heads 23 which are guided in arms 24, said arms being pivoted at their forward ends at a point 25. The cross-heads 23 are reciprocated back and forth with the cutting tools by a swinging arm 26 that is pivoted to the housing 9 at a point 27. The arm 26 is provided with a crank pin 28 upon which is mounted a block 29 in which are clamped the rear ends of connecting rods 30. These connecting rods are secured at their front ends to pins 31 on the respective crossheads, and are clamped within the block 29 by nuts 32. The cut on the teeth is produced by the rearward movement of the tools 21, which movement is produced by a pull on the connecting rods 30. To prevent said rods from being drawn through the block 29, the rear ends of the connecting rods are threaded and carry nuts 33 which abut against the rear face of the block 29.

The power for driving the machine is applied to the belt pulley 34 that is mounted upon a shaft 35 and normally is loose thereon, but may be clutched to said shaft by any suitable form of clutch 36, the same being operated by a clutch lever 37 that is pivoted to a bracket 38 projecting from the housing 9. As appears more clearly from Figs. 11 and 6 of the drawing, the shaft 35 carries a pinion 39, said pinion being keyed to the shaft but capable of longitudinal movement thereon. This pinion lies between the parallel arms 40 of a bifurcated hand lever 41, said lever projecting forwardly through a slot 42 in the front face of the housing 9. (See Fig. 1.) This slot is provided on its lower face with a series of steps or serrations in each of which there is a hole or opening 43 that is adapted to receive the lower engaging end 44 of a grip lever 45 that is carried by the hand lever 41. Journaled in the rear ends of the bifurcated arms 40 and meshing with the pinion 39 is an idler pinion 46, said idler pinion being adapted to mesh with the teeth of a cone gear wheel 47 that is secured to a shaft 48, said shaft being journaled in the housing 9 above the shaft 5. As shown in the drawings, the lever 41 is in the upper end of the slot 42, in which position the idler pinion 46 is in mesh with the large part of the cone gear wheel 47, so as to turn the shaft 48 at its lowest speed. By compressing the grip lever 45 and withdrawing its engaging end 44 from the opening 43 in the housing 9 and shifting the lever 41 down the slot, the said idle pinion 46 can be brought into mesh with any desired part of the cone gear 47, and the speed of the shaft 48 will thereby be correspondingly accelerated. When thus shifted, the grip lever 45 will again engage with the opening 43 in the housing and securely hold the lever and idle pinion in position.

Secured to the left end of the shaft 48 is a crank disk 49, shown in detail in Figs. 8 and 9. This crank disk is provided with a central T-shaped slot 50 across its left hand face, in which slot I mount a cross-head 51, said cross-head carrying a crank pin 52. At a point 53 I form a bridge across the said slot in which I journal one end of an adjusting screw 54, the opposite end of said screw being threaded through the cross-head 51. The screw is provided with thrust collars on either side of the bridge, and its end beyond said bridge is squared at 55 to receive a wrench. By turning the adjusting screw, the cross-head with its crank pin can be moved toward and from the center of the crank disk. The crank pin 52 projects into a T-slot 56 in the swinging arm or lever 26 (see Fig. 10), and works loosely therein. The said lever is pivoted directly below the shaft 48 upon which the crank disk is mounted, and as said disk rotates the upper end of the lever or arm will be oscillated back and forth. It being remembered that the said arm or lever carries the crank pin 28, it will be understood that the rotation of the crank disk will cause the reciprocation of the cutting tools 21. As the disk turns in the direction of the arrow in Fig. 4, the crank pin 52 will work in the outer end of the slot 56 during the cutting stroke of the tool and in the inner end of the slot during the return of the tool. By this means, a slow advance and a rapid return of the tool is secured.

Inasmuch as the tooth to be cut is wider or thicker at the root than it is at the addendum, the cutting tools must be gradually separated as the cut on the teeth increases in depth. For this reason, the arms 24 are pivoted at their front ends, as hereinbefore stated, and they are provided at their rear ends with arms 57, said arms preferably carrying at their extreme ends anti-friction rollers 58. (See Fig. 2.) These rollers lie upon templet plates 59 and 60, said templet plates being secured to an oscillating head 61 that is carried by a vertical shaft 62, said shaft being journaled in brackets or arms 63 and 64 that project from the housing 9. The specific means for rocking the shaft 62 and for turning the templets will be described later, the purpose of the present description being to show that as the templet plates 59 and 60 are moved to the right, as shown in Fig. 4, the arms 57 will be gradually separated, which will carry the cutting tools 21 farther and farther apart as the operation on the tooth proceeds. As is well understood, the faces of intermeshing gear teeth should be so designed as to produce a rolling contact, and the exact design may vary under different conditions. The templet plates 59 and 60 have their operating faces so shaped that, as the head 61 is rotated, the cutting tools 21 will be caused to move in such manner as will produce the desired shape of tooth.

Referring to Fig. 5 of the drawing, which shows a section taken on the line 5—5 of Fig. 4, it will be seen that the arms 24 are pivoted upon a bolt 65, said bolt passing loosely through the housing 9, and through an eye-piece 66 on the lower arm 24, and screwing into a similar depending eye-piece 67 on the upper arm 24. This bolt and the eye-pieces form a suitable pivot upon which the arms 24 have the slight degree of pivotal movement necessary. To strengthen the pivot, and to securely hold the said arms 24 in their proper relation, said arms are provided with lateral extensions 68 and 69 which project into circular ways 70 in the side of the housing 9. As is indicated at 71 in Fig. 4, and as appears from Fig. 2, said housing is also provided with a circular way some distance removed from the pivot point into which fingers 72 carried by the arms 24 project, so that lateral movement of the said arms is prevented.

Figure 26:
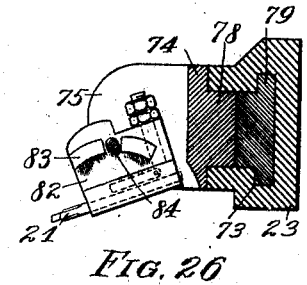
Figure 27:
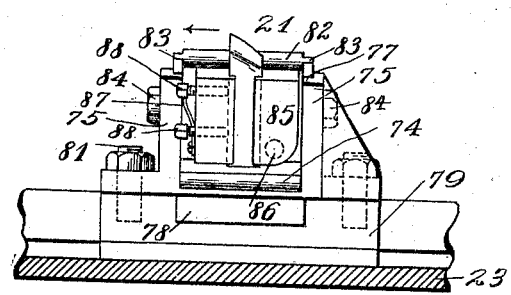

I will now direct attention to the tool-holder which is shown in Figs. 24 to 27 inclusive. In Figs. 26 and 27 the frame or cross-head 23 is shown, from which it clearly appears that it is provided with a T-slot 73 within which the tool-holder can be adjusted back and forth and securely clamped in position. This tool-holder consists of a main member 74 having two side cheeks 75, said cheeks each being provided with a curved slot 76 extending therethrough and with a curved groove 77 on its inner face. The main member 74 has at its rear, and centrally located thereon, a rectangular projection 78 that extends between the lips of the T-slot in the cross-head 23. Within the said T-slot there is a second member 79 having at its center and left hand face a socket or depression within which the extension 78 of the main member fits. Projecting from the said second member 79 and extending through slots 80 in the main member, are bolts 81, carrying nuts which may be tightened so as to clamp the members 74 and 79 against the lips of the cross-head. By loosening these nuts the entire tool-holder may be slid along in the cross-head until the tool is brought into the desired position, depending upon the size of the gear blank to be operated upon.

Between the cheeks 75 and the main member of the tool-holder, I mount a cradle 82, said cradle having at either end thereof an arc-shaped tongue 83 that is adapted to fit and slide within the curved groove 77 in the inner faces of the cheeks 75. By rocking this cradle between the cheeks, the point of the tool 21 is raised and lowered as desired, after which the cradle may be secured in position by bolts 84 that project through the curved slot 76 and receive nuts on their outer ends that may be tightened against the cheeks 75.

As has been stated, the tools are intended to cut on the backward stroke of the cross-heads. In moving the tools forwardly again for the next stroke, it is necessary to permit them to be swung away from the gear blank so that they will not gouge into the latter and either mar the work or break some part of the mechanism. For this purpose the tool 21 is carried in a swinging plate 85 that is pivoted at one of its inner corners, 86, to the bottom of the cradle. During the cutting stroke, which is in the direction of the arrow in Fig. 27, the plate 85 abuts against the inner face of the adjacent cheek 75 which holds the plate and the tool from backward movement. During the return of the tool, if the latter should engage with the gear blank, the plate 85 will be swung about its pivot 86 against the tension of a spring 87 which is secured to the plate and bears against the other cheek 75, thereby permitting the tool to pass beyond the gear blank ready for the next cut. The tool 21 is retained within the plate 85 by means of set screws 88 in an obvious manner.

*Mechanism for swinging the table.*—Referring again to Fig. 11, it will be seen that the drive shaft 35 has secured thereto, near its inner end, a gear 89, which gear meshes with an idler gear 90 that is carried upon a stationary stud 91. The said gear 90 meshes with a gear 92 upon a shaft 93 that is journaled in the arms 11ᵇ and 11ᶜ hereinbefore referred to. This shaft carries at its inner end a bevel pinion 94 that meshes with a bevel gear 95 on a forwardly extending shaft 96 that is journaled in the arms 11 and 11ᵃ of the main frame. The forward end of said shaft carries a bevel pinion 97 that meshes with a bevel gear 98 on a short vertical shaft 99 that is journaled in the pivot boss 14 of the swinging table 13. The upper end of this shaft has secured thereto a bevel pinion 100, and the point 8, referred to in the first part of this specification as being the center of curvature of the left and rear sides of the main frame, (see Fig. 2), lies within the axis of this shaft.

Referring more particularly to Fig. 12 of the drawing, which shows a plan view of the swinging table and the mechanism carried thereon, the shaft 99 and gear 100 appear at the upper right-hand corner thereof. The gear 100 meshes with a bevel pinion 101 on a short horizontal shaft 102 that is journaled on the upper surface of the table 13. On its opposite end this shaft carries a bevel pinion 103 which meshes with a similar pinion 104 on a shaft 105, which is journaled in bearings 106 and 107 at the two ends of the table. The shaft 102, the gears carried thereby and the gears meshing with said gears are inclosed within a casing 108 that is mounted upon the upper surface of the table. The table is caused to move or swing about on the frame by a pinion 109 (see Fig. 3), that meshes with the segmental rack 7 on the main frame. As will be seen from Fig. 2, the frame is swung to the right during the cutting operation, and the travel of the frame at this time must be comparatively slow. After a tooth has been completed, it is necessary to swing the table backwardly so as to bring the finished tooth out of the range of the cutting tools in order that the gear blank may be turned the proper distance to present a fresh tooth to the tool. It is desirable that this backward movement of the swinging table be produced at a much higher speed than the advance movement thereof. I will now describe the means for turning the pinion 109 and for reversing the motion thereof whereby these movements of the swinging table are effected.

As appears from Figs. 12 and 19, the shaft 105 is provided within the casing 16, with a worm 110, said worm meshing with and turning a worm wheel 111 on the lower end of a short vertical shaft 112 that is suitably journaled in the said housing. The upper end of said shaft has secured thereto a bevel gear 113, said gear meshing with a bevel pinion 114 on a shaft 115 that is also journaled in the casing 16. Toward its left hand end, the shaft 115 is provided with a long key-way 116 so as to drive a gear 117 that is carried by the shaft and that is capable of movement along said key-way. (See Fig. 22). The gear 117 is therefore driven with the shaft but is capable of lateral adjustment thereon. The said gear is mounted between the parallel arms 118 of a bifurcated hand lever 119, said lever projecting outwardly through the slotted opening 18 of the casing 16, and having a hand grip 120 with a projecting point for engagement with holes 121 in the said casing. Between the parallel arms 118 of the hand lever I journal an idler gear 122, said gear being adapted to mesh with any part of a cone gear 123 that is loosely mounted on a shaft 124 that is journaled in the casing 16. The right hand face of the cone gear 123 is provided with a clutch member 125, with which is adapted to engage a clutch member 126 that is keyed to the shaft 124 so as to drive the same in either direction but be capable of lateral movement thereon. When the said clutch members are brought into driving relation, the shaft 124 will be turned with the cone gear 123, and this engagement is maintained while the table is turning so as to cut the teeth on the gear blank. The left hand end of the shaft 124 is provided with a worm 127 that meshes with and drives a worm wheel 128 that is secured to the upper end of a shaft 129, to the lower end of which shaft the pinion 109 is secured. (See Fig. 3). While therefore the clutch members 125 and 126 are maintained in engagement, the pinion 109 will be very slowly rotated so as to swing the table toward the cutting tools.

I will now describe the means for reversing the pinion 109 whereby the swinging table is moved back to carry the gear blank away from the tool, and I will invite attention to Figs. 20 and 21, from which it will be seen that the shaft 105 has keyed thereto a gear 130, which meshes with a smaller gear 131, which is loosely journaled on a shaft 132, that lies below the shaft 124 and parallel therewith. The pinion 131 is provided with an elongated hub on one side upon which is keyed a gear 133 which meshes with a pinion 134 that is loosely journaled on the shaft 105. The extended hub of this latter pinion has keyed thereto a gear 135 which meshes with a pinion 136 which is keyed to the shaft 132. Also keyed to the latter shaft at the side of the pinion 136 is a gear 137, which meshes with a gear 138 on the shaft 124. This latter gear is provided with a clutch member 139 with which the clutch member 126, hereinbefore described, is adapted to be thrown into engagement. It being remembered that the clutch member 126 is secured to the shaft 124, it will be understood that the arrangement of gears above described will produce a rapid rotation of the shaft 124 in a reverse direction to that taken by the shaft when driven by the cone gear 123, the result being that the pinion 109, Fig. 3, will be rotated rapidly, which will swing the table back quickly and bring the gear blank out of engagement with the cutting tools.

The clutch member 126 is automatically shifted so as to throw it into driven engagement with the members 125 and 139 by means of a shifting yoke or lever 140, (see Fig. 23). This yoke or lever is pivoted on a vertical pin 141 on the inner side of the casing 16, and it carries, on a vertical pivot at its center, a spider frame (142), said frame working in a groove in the center of the clutch member 126. The said yoke on its outer end is forked into two arms 143 and 144, and the latter arm, is connected, by means of a link 145, with a crank arm 146. This crank arm is secured to a vertical rock shaft 147 that is journaled in lugs 148 on the outside of the casing 16. (See Fig. 1). On the lower end of said rock shaft is a second crank arm 149 that is adapted to engage with adjustable stops 150 and 151, said stops being secured within a circular T-slot 152 near the outer curved edge of the frame. These stops may be secured in any desired position by means of screws 153, (see Fig. 1.)

Figure 31:
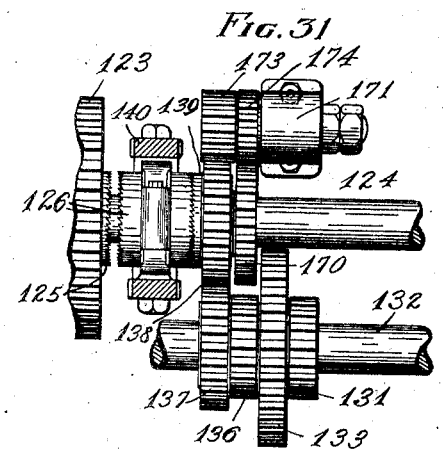
Figure 32:
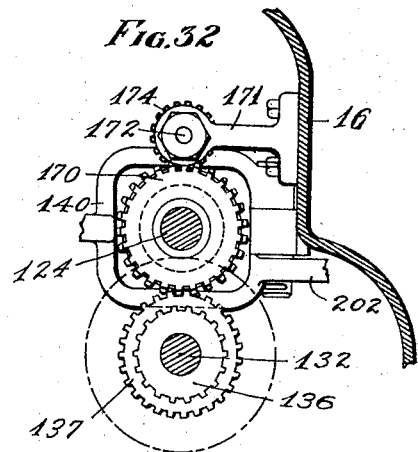
Figure 33:
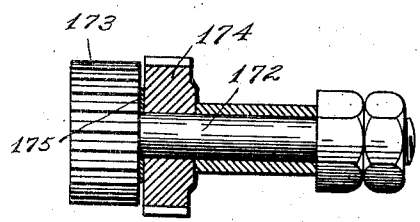
Figure 34:
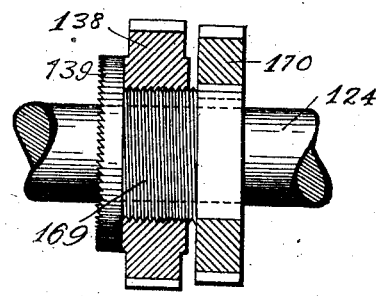

As shown in Fig. 2, the stops 150 and 151 are set comparatively close together, as it will be understood that the travel of the swinging frame necessary for producing the required depth of tooth on the gear blank is short. Inasmuch, however, as the machine must be adapted for cutting gears of different angles, it will be necessary to start the swinging table from different initial positions, and for that reason the segmental rack 7 and the T-slot 152 are extended as shown in Fig. 2. In this figure the table is shown substantially in its backward position for cutting teeth on the gear blank shown, the crank 149 being ready to engage with the stop 150. The continued backward movement of the table will rock the cranks 149 and 146 to the right, thereby disengaging the clutch members 126 and 139, and engaging the clutch members 126 and 125 for the advance movement of the swinging table. Conversely, after the table has swung to its predetermined extent, the crank arm 149 will engage with the stop 151, which will swing the yoke 140 in the opposite direction, disengaging the clutch members 125 and 126 and reëngaging the clutch members 126 and 139. The engaging portions of these clutch members are provided with pointed teeth, preferably in the form of ratchet teeth as shown in Figs. 12 and 31. These teeth are, of course, comparatively weak at their outer portions; and, if they were permitted to have driving engagement while the mere points of the teeth were in contact, said teeth would be liable to break, bend or wear excessively. To prevent this result I have devised a means for throwing the clutch member 126 suddenly in either direction after the same has once been materially started in said direction. This means, which is best illustrated in Figs. 1 and 23, consists of a pair of toggle levers 154 and 155, the latter lever being composed of a lower socket member and an upper plunger extending into said socket member. The plunger member is provided with nuts 156 against which and against the upper end of the socket member bears a strong coiled spring 157, said spring tending to force said members apart. The toggle levers 145 and 155 are hinged together at their centers by a pin 158, said hinge and pin lying between the arms 143 and 144 of the forked shifting lever 140. When the toggle levers are in one line, as in Fig. 12, there is no tendency of the spring 157 to throw the toggle in either direction; but the instant said levers are pressed out of line at their centers, the said spring will cause the levers to break with considerable force, which will throw the shifting lever and the clutch member 126 rapidly into engagement with the member 125 or 139, as the case may be. The toggle lever 154 is pivoted at 159, and extends upwardly above said pivot for some distance, as appears at 160. On this extended portion of this toggle lever I mount a housing 161 for a plunger pin 162, said pin being pressed inwardly by a coiled spring 163 surrounding the same. This pin is rounded or beveled on its inner end, and is adapted to enter a hole or depression 164 which is formed in the casing 16 in a position to receive the inner end of the plunger pin when the toggles are in their central position and thus yieldingly hold the same in such position. I have provided means, however, for holding said pin out of operative condition, said means consisting of a cross-pin 165 in the stem of the pin, said cross-pin being adapted to enter recesses 166 in the side of the housing 161 when the plunger pin is turned so as to bring the cross-pin and said slots into alinement. By drawing outwardly on the plunger pin and turning the same so as to throw the cross-pin out of alinement with said slots, the plunger pin will be held out of operative condition.

As appears from Figs. 2, 3, and 12, the worm 127 and worm wheel 128 are inclosed within a casing 167 that is secured to the casing 16. It may sometimes be desirable to swing the table 13 upon the frame without running the entire machine for that purpose, and I have therefore applied to the shaft 124 a hand wheel 168. By unclutching the member 126 from the members 125 and 139, which may be done by moving the extension 160 of the lever 154, the shaft 124 is left free to be rotated by this hand wheel, and by simply turning the same the table may swing about as desired.

As will be understood from the foregoing description, the swinging table and the gear blank carried thereby will be moved quite rapidly away from the cutting tools. It may, therefore, happen that the said table will be swung backwardly while the cutting tools are in mid position, taking a cut on a tooth, and in this event the tooth would be left in an unfinished condition. I therefore provide a means for securing a slight amount of lost motion in the train of gears for reversing the table so that the latter will not be started backwardly until the tools have completed their cutting operation. The mechanism for securing this result is illustrated in detail in Figs 31 to 34, and parts of the same also appear in Fig. 20. As appears from Fig. 34, the clutch member 139 is provided with a hub 169 which is screw-threaded exteriorly, and the gear 138 is threaded on this hub so as to have lateral movement thereon. Keyed, or otherwise secured, to the end of the hub outside the gear 138, is a gear 170, the latter gear being of somewhat smaller diameter than the gear 138. Projecting inwardly from the rear face of the casing 16 above the gears 138 and 170 is a bracket arm 171 in which is journaled a short shaft 172. Secured to the end of the shaft 172 is a pinion 173, and loosely mounted on the shaft is a pinion 174, said pinions meshing respectively with the gears 138 and 170. As the said gears are of different diameters, the pinions 173 and 174 will be of correspondingly different sizes.

The operation of this device is as follows: Starting with the parts in the position shown in Fig. 31 and assuming that the clutch member 126 has just been thrown into engagement with the member 139, the swinging table is ready to be moved backwardly from the cutting tools. The gear 137 is in motion, and is turning the gear 138 so as to drive the clutch members 126 and 139. The gear 138, however, is loose upon the hub of the member 139 so that said member will not be turned by the gear until the latter has traveled to the right and has contacted with the gear 170, which gear, it will be remembered, is secured to the hub of the clutch member. When these gears have thus contacted they will turn together as one piece. As the gear 138 is traveling down the hub of the clutch member it will turn the pinion 173, which pinion is separated from the pinion 174 by a friction ring 175, so that said pinions tend to rotate together, but may have independent movement. The pinion 174 being in mesh with the gear 170, it cannot turn unless it also swings the table; and the weight and friction of the devices is sufficient to overcome the friction between the pinions so that the table remains at rest until the gears 138 and 170 are in contact. The table having been swung to its extreme backward movement, the clutch member 126 is again shifted into engagement with the clutch member 125 for an advance movement of the swinging table. This leaves the clutch member 139 loose upon the shaft 124 so that it may rotate freely thereon. The continued rotation of the gear 138, therefore, will rotate both the pinions 173 and 174, and the latter will turn the gear 170 and the clutch member 139. Owing to the difference in the diameters of the two gears, and the two pinions, the gear 170 will be turned more rapidly than the gear 138, with the result that the latter gear will be again moved laterally upon the hub of the clutch member; and it will continue this movement until the said gear abuts against the clutch member, when the parts will again be in the position shown in Fig. 31. During the traveling of the gear 138 to the right, the swinging table remains stationary so that the cutting tools will have ample time to complete their travel and the cut they may then be taking before the table and the gear blank is moved backwardly therefrom.

*Gear blank centering device.*—By reference to Figs. 1 and 2 it will be seen that in order to produce the proper shape of tooth on the gear blank, the latter must be so positioned that the tools 21 will lie in substantially the same horizontal plane as the axis of the gear blank, while the beveled surfaces on the diametrically opposite sides of the gear blank on this plane will converge at the point 8 or in the vertical line in which said point lies. In order to definitely locate this point, I form an axial opening through the bolt 65 (see Fig. 5), through which I pass a pointed pin or needle 176, said pin having a pointed inner end and a headed outer end. When the head of the pin is brought up against the head of the bolt 65, the point thereof will lie in the vertical line through the point 8. (See Fig. 2.) The gear blank 15 is carried upon a mandrel or arbor 177, said mandrel having a tapering inner end which is adapted to fit into a socket in the mandrel shaft 178 (see Fig. 22ᵃ). The mandrel shaft is journaled in the ends of the casing or housing 17, and the mandrel is held within said shaft by means of a long bolt 179 that extends throughout the length of the shaft and is tapped into the mandrel at 180. The gear blank is held on the mandrel by a nut 181 that is threaded upon the outer end of the mandrel. On its end opposite the mandrel, the shaft 178 is adapted to receive a large worm gear 182, the function of which will be hereinafter stated. In order to cause the extensions of the bevel sides of the gear blank to converge at the point of the pin 176, the gear blank, the mandrel and the mandrel shaft will have to be moved back and forth on the swinging table. For this reason said table is provided with a large opening 183 having slides or ways 184 along its side edges (see Fig. 19). The housing or casing 17, containing the mechanism for controlling the rotation of the gear blank, is provided with guides 185 that fit within the lips of the ways 184. Secured to the bottom of the casing 17 between the said lips is a screw-threaded eye-piece 186 (shown in dotted lines in Fig. 12) receiving a threaded shaft or rod 187, said shaft or rod extending outwardly through the end of the swinging table, beyond which it is squared for the reception of a wrench by means of which the said shaft may be turned. Suitable thrust collars are carried by said rod or shaft adjacent the table 13 so as to prevent lengthwise movement. By turning this rod or shaft the casing or housing 17 which carries the gear blank may be moved back and forth as desired. After the housing has been moved to the desired position, it is necessary to clamp the same in such position so as to prevent accidental movement. For this purpose friction plates 188 are secured loosely to the housing by bolts 189 which pass through said friction plates and are tapped into the guides 185 on the housing. Also loosely mounted upon said bolts 189 are levers 190, there being one lever for each bolt. Projecting from the lower part of the housing 17 are pairs of lugs or eye-pieces 191, between which pairs I mount upon a shaft 192, which passes through said eye-pieces, eccentrics 193, said eccentrics being keyed to the shaft 192 but being capable of lateral movement thereon. But one lug 191 and one eccentric is shown in the drawings. (See Fig. 19.) When the eccentrics 193 are turned into the position shown in Fig. 19, the levers 190 do not clamp the friction plates 188 against the ways 184, and the entire housing 17 is free to be moved upon the table 13 by the rotation of the screw shaft 187. When, however, the eccentrics are turned, say through 180 degrees, the levers 190 are pressed downwardly by said eccentrics and the friction plates are caused to engage with the said ways 184 which thereby hold the housing in place.

*Mechanism for turning the gear blank.*— It will be understood that after one tooth on the gear blank has been cut, said blank must be rotated so as to present a fresh portion upon which the next tooth may be cut. This rotation must be intermittent, and must take place while the gear blank is removed from the cutting tools. For accomplishing this result I key to the outer end of the shaft 105 (see Figs. 12 and 14), a friction clutch member 194, said member having an internal flange or hub 195 upon which I loosely journal a spur gear wheel 196, said gear wheel having on its periphery a flange so as to provide an extended bearing therefor. Beyond the friction member 194 the shaft 105 is turned down to a smaller diameter so as to receive an outer friction member 197. The sides of the gear wheel 196 are adapted to be frictionally engaged by the friction members 194 and 197 so that there is a tendency for the gear 196 to be driven with the shaft 105, the friction between the gear and the members being increased by the pressure of wood-fiber disks 198 and 199 between these parts. The member 197 is socketed on its outside at 200 for the reception of a coiled spring 201. The end of the shaft 105 is screw-threaded so as to receive a milled nut 202 which engages with the said spring and by means of which the spring can be compressed so as to regulate the degree of friction in the clutch. This friction is always sufficient to rotate the gear blank, through the mechanism hereinafter described, whenever the gear 196 is permitted to turn. As stated, however, the movement of the gear blank must be intermittent, and I secure this intermittent motion by a locking device for the said gear wheel 196, in describing which I will invite attention to Figs. 12, 14 and 17. Secured to the inner face of the gear wheel 196 by bolts 203, is a plate 204, said plate being provided with a socket or hole 205 that is adapted to receive the end of a locking rod 206. The ends of the plate 204 are beveled, as shown in Fig. 17, for a purpose hereinafter stated.

The rod 206 is guided in suitable bearings on the table 13, and is pressed toward the left, as shown in Fig. 12, by a coiled spring 207, that is compressed between a collar 208 on the rod and the casing 17. On the inner end of the rod 206, within the casing 17, I secure a hooked member 209, with the hooked portion of which there is adapted to engage a pivoted pawl or hook 210, said pawl being pressed downwardly into engagement with the member 209 by a spring 211. The pawl 210 is carried on the inwardly extending arm 212 of the clutch shifting yoke or lever 140, and its right hand end, as viewed in Fig. 12, is beveled at 213 so that, when the arm 212 of the shifting yoke is swung to the right, this beveled portion of the pawl 210, will engage with an adjustable stop 214 and cause the hooked end of said pawl to release the member 209 on the locking rod 206. Normally, therefore, the end of the rod 206 is thrust into the socket of the plate 204, and the gear 196 is locked. Whenever the swinging table is moved to its desired extent for cutting a tooth, the shifting yoke 140 is moved, as hereinbefore described, which throws the arm 212 to the left and causes the pawl 210 to engage with the hooked end of the rod 206. The table then swings backwardly to its original position, when the shifting yoke is again moved, which movement throws the arm 212 to the right and draws the locking rod 206 out of the socket 205 in the plate 204 on the gear wheel 196, thus releasing said wheel so that it may be turned by the friction mechanism shown in Fig. 14. Said gear wheel must be permitted but a single rotation, however; and for the purpose of again arresting said wheel at the end of such rotation, the pawl 210 is beveled at 213, as previously described, so that said beveled portion, engaging with the stop 214, will release the locking rod and permit the same to be thrown to the left into engagement with the wheel 196. As the said gear completes its rotation the beveled end of the plate 204 will cam back the locking rod 206 until the socket 205 comes into register with said rod, when the latter will again snap into position and check the rotation of the wheel.

Motion is transmitted to the gear blank 15 from the gear 196 through mechanism now to be described. Meshing with the gear 196 is a gear 215 on a shaft 216 that is journaled in suitable bearings upon the table 13, the inner end of said shaft terminating within the casing or housing 17. Near the said inner end of this shaft the latter is provided with a long key way and an elongated sleeve 217 (see Fig. 13), said sleeve being keyed to said shaft so as to turn therewith but be capable of endwise movement thereon. The right hand end of the sleeve is provided with a flange 218, and, toward the left hand end of the sleeve, there are keyed thereto a number of spur gears, Fig. 13 of the drawings showing four of such gears, 219, 220, 221 and 222. That part of the sleeve between the flange 218 and the gear wheel 219 passes through the end of the casing 17, so that as said casing is moved back and forth on the table 13, the sleeve 217 and the gears 219 to 222 will be moved correspondingly. Journaled in the casing or housing 17 above the shaft 216 is a shaft 223, upon the left hand outer end of which, beyond the casing 17, I journal gear wheels 224, 225, 226, and 227, said gear wheels meshing with the gears 219 to 222 respectively. All of the gear wheels 224 to 227 are unclutched or disconnected from the shaft 223 with the exception of one of said wheels, and means are provided for clutching any desired one of said wheels with its shaft. This means consists of a rod 228 that projects into a bore in the center of the left hand end of the shaft 223, said rod being provided on its outer end with a milled head 229 so that the rod may be turned, the latter being held in position by a screw 230, the inner end of which projects into a groove 231 in the rod. As appears from Fig. 15 of the drawing, the shaft 223 carries four tubular locking members 232, said members being contained in sockets 233 in the shaft. In said figure the locking member 232 that is shown in full lines has its locking end 234 projecting from the perimeter of the shaft so as to engage with the inner part of the hub of the gear with which said member is adapted to coöperate. When, therefore, the locking member 232 is in the position shown in full lines in said Fig. 15, the gear wheel with which it coöperates is locked to the shaft 223. Within the member 232 is a coiled spring 235, said spring bearing with its ends against the outer end of the tube in the member 232 and against the rod 228. The inner end of said member is closed by a screw threaded nut 236, said nut having a hemispherical inner end 237. Within the rod 228 I form hemispherical sockets or depressions 238 corresponding in position along the rod with the hemispherical ends on the nuts 236. The sockets 238 are so arranged on the rod 228 that but one of the hemispherical nuts 236 can enter a socket at any one time, so that but one of the gears 224, 225, 226, and 227 can be clutched to the shaft at any one time. With the parts in the position shown in Fig. 15, a simple turn of the rod 228 will force inwardly the clutch member 232 that is shown in full lines, and thus unclutch the gear with which it has been in connection, and at the same time it will bring another socket 238 into position for the reception of another hemispherical end 237, whereupon the spring 235 of that clutch member will force said member into engagement with its gear wheel.

In Fig. 16 I have shown a dial 239 having arranged thereon characters 240 so positioned that when the milled head 229 is turned to a position indicated by said characters, a socket 238 corresponding to said character will be brought into operative relation with the hemispherical nut in its clutch member, so that the desired gear will be clutched to the shaft 223.

As will be seen by reference to Fig. 12, the shaft 223 is provided with a long key-way 241 upon which there is adapted to slide a gear 242, said gear being mounted between the parallel arms 243 of a yoke lever 244, said lever projecting outwardly through the slot 19 in the casing or housing 17. As appears from Figs. 18 and 19, the lever 244 outside of the casing carries two grip levers 245 and 246, each of said grip levers having an end that is adapted to engage in a socket 247 in the casing. By reference to Fig. 2 it will be seen that the slot 19 extends diagonally of the casing 17 and the inner edges of said slot are provided with teeth, the spaces between which will be occupied by the lever 244 when in its locked positions. In Figs. 18 and 19 the lever is shown as thrown to the left and the grip lever 246 is then in engagement with a socket 247 on that side of the slot. By pressing the grip levers 245 and 246 and throwing the lever to the right, the grip lever 245 will engage with the socket on the opposite side of the slot and will lock the grip lever in that position.

Journaled in the ends of the parallel arms 243 is an idler pinion 248, said pinion meshing with the gear 242, and being adapted to be thrown into operative engagement with any one of two series of cone gears 249 or 250, said cone gears being secured to the respective shafts 251 and 252, that are journaled in the ends of the housing or frame 17. As appears from Fig. 12, the cone gears 249 and 250 are quite extended in length and have a large number of separate rows of gear teeth thereon, each of said rows forming in effect a separate gear wheel, although the different rows of teeth may be formed on a continuous gear, if preferred. The numbers of teeth in the different rows on these cone gears vary, the largest number being on the right hand end of the gear 249, and the smallest number being on the right hand end of the gear 250. By such an arrangement of cone gears, the distance between said gears from end to end is substantially constant. By throwing the hand lever 244 from one side to the other of the slot 19, the idler pinion 248 will be brought into driving relation with either one or the other of said cone gears as may be desired. Furthermore, by shifting the hand lever 244 and the gears 242 and 248 longitudinally of the shaft 223, the idler pinion 248 may be brought into driving relation with any one of the different rows of gear teeth on the cone gears.

Inasmuch as the gear wheel 196 on the shaft 105 is given a complete rotation each time it is released by the rod 206, and the gear wheel 215 is preferably of the same size as the gear wheel 196, it will be understood that the shaft 216 will be given one rotation at each time the gear wheel 196 is released. If the locking member 232 belonging to the gear wheel 224 (see Fig. 13) is in driving engagement with said gear, the shaft 223 will be turned a much greater distance than if its motion were derived from the gears 222 and 227. By the mechanism shown in said Fig. 13, four different degrees of travel can be imparted to the shaft 223. Therefore, four different degrees of rotation may be imparted to the gears 242 and 248, so that, without changing the hand lever 244, the degree of movement imparted to the gear blank 15 may be varied four times. However, owing to the great number of rows of teeth on the cone gears 249 and 250, either one of which may be thrown into driving engagement with the gear 242, any desired number of variations of movement can be imparted to the gear blank 15, for cutting any required number of teeth thereon. It will be understood, furthermore, that a greater number of differential gears may be applied to the shaft 223, and a greater number of rows of teeth may be provided on the cone gears, if desired, so as to secure a greater number of variations in teeth on the gear blank.

On the rear ends of the shafts 251 and 252 I secure bevel gears 253 and 254 respectively, said gears meshing with bevel pinions 255 and 256 on a short vertical shaft 257 that is journaled in suitable bearings on the end of the casing or housing 17. Also journaled on the same end of this casing is a horizontal shaft 258, having on one end a bevel gear 259 that meshes with the bevel gear 253 and, on the other end, a spur gear 260 that meshes with a spur gear 261 on a horizontal worm shaft 262 that is also journaled in bearings on said casing. This latter shaft is provided with a worm 263 that engages with and drives the large worm wheel 182 on the mandrel shaft 178, said worm gear being indicated in dotted lines in Fig. 18 in order that it may not hide the mechanism beyond the same. When the idle gear 248 is in mesh with the cone gear 249 so that the shaft 251 and bevel gear 253 are driven direct thereby, the worm wheel and the arbor shaft with the gear blank will be turned. The shifting of the idle pinion 248 into engagement with the cone gear 250 will still cause the bevel pinion 253 to be driven, but in this case it will be driven through the medium of the bevel pinions 254, 255 and 256.

It may at times be desirable to turn the gear blank without driving the entire mechanism of the machine, and for this reason I provide the end of the shaft 262 with a squared portion 265 for the reception of a crank or wrench; and I also provide a clutch between said shaft 262 and the pinion 261. As shown in Fig. 18, the shaft carries a clutch member 266, and the pinion 261 carries a corresponding clutch member 267. Outside of the gear 261 the shaft 262 carries a milled nut 268 which may be loosened so as to permit the clutch members 266 and 267 to separate, when the shaft 262 may be turned by the said crank so as to set the gear blank in any position desired. When so set, by screwing up the nut 268, said clutch members are again forced into driving relation, at which time the machine is ready to operate.

*Templet operating mechanism.*—As has been hereinbefore described, the templet plates 59 and 60 are secured to a rocking head 61 on the upper end of the rock shaft 62. This rock shaft has secured to its lower end a segment plate 269, with which engages a rack bar 270 that is secured to the end of a long curved bar 271. This bar conforms in curvature to the base frame 1, and is mounted to slide between brackets 272 projecting from said frame. The said bar is clamped to the swinging table 13 by means shown in detail in Fig. 7 of the drawing; said means consisting of a rigid arm 273 carrying a clamping foot 274 that is adapted to engage with the upper surface of the said bar 271. Journaled on the arm 273 is a rock shaft 275 having an operating handle 276. The inner end of the rock shaft is provided with an eccentric which projects into an eye-piece 277 on a vertical bolt 278 that extends through the foot piece 274 and through a clamping block or plate 279, the bolt having a nut 280 below said block. By turning the handle 276 the block is drawn toward the foot piece, and the bar 271 is clamped between these two members so as to securely attach the said bar to the swinging table. This bar 271 extends throughout the length of the rack bar 7 on the frame 1, and may be secured to the table irrespective of the position which the latter may occupy on the base plate. As the table swings on said plate in cutting the gear, the head 61 will be rocked so as to separate the arms 24 carrying the cutting tools so that the proper shape of tooth may be secured.

In Figs. 28, 29 and 30 I have shown modifications of the templet operating mechanism. In Fig. 28, a sliding templet plate 281 is employed, said plate having a pair of diverging cam slots 282 therein, within which the antifriction rollers on the arms 57 extend. These cam slots are so shaped that as the plate is moved back and forth the arms 57 will be given their proper movements. The plate is moved by means of a double segment 283, the latter engaging with rack teeth 284 on the plate, and the lower bevel teeth 285 meshing with corresponding teeth 286 on a double segment 287, shown in Fig. 30. This latter segment is pivoted on a vertical pin 288 that has a bearing in a bracket 289 projecting from the housing 9. In the form shown in Fig. 29, the templet plates 290 and 291 are mounted upon opposite sides of the pivot 292 of a rocking plate 293, said plate having a downwardly extending segment 294 with bevel gear teeth 295 on its lower end. These gear teeth mesh with the teeth 286 of the double segment 287 shown in Fig. 30, said segment being operated by the rack bar 270 hereinbefore described.

*Tool oiling mechanism.*—As has been described, the frame 1 is provided with an oil well or receptacle 3 in the lower part of the base, the frame being so designed as to conduct all of the oil drippings to this well, the screen 5 separating all solid matter therefrom so that the oil entering the well is comparatively free from such substances. In cutting, it is necessary, or at least desirable, to have oil supplied directly to the tool to prevent the latter from heating. For this purpose I provide an oil pump 296 of any suitable form (see Fig. 4) and drive the same from a bevel pinion 297 on the shaft 96. Said pinion gears with a bevel pinion 298 on a short vertical shaft that is carried by the bracket 11. On the lower end of this shaft is a bevel gear 299 that meshes with a correspondingly shaped gear 300 on the shaft of the pump. The oil is drawn from the well 3 through a tube 301 and is forced upwardly through a flexible tubing 302 to the cutting tools, the upper end of said tubing being attached to a pipe 303 that is supported in a bracket arm 304 above the tool holders. While the machine is in operation, the oil will be continuously pumped through said tube and pipe and will be directed upon the cutting tools.

To enable the operator to reach the interior of the frame 1 the same is provided on its front side with a pivot door 305.

While I have shown and described my preferred construction, I realize that changes may be made in many of the details, and I desire it to be understood that the following claims are not intended to be limited to the details shown any further than is made necessary by their expressed terms.

I claim:

1. In a machine for cutting bevel gears, a cutting tool, a slide upon which said tool is carried, means for reciprocating said slide, a pivoted arm carrying said slide, a frame upon which said pivoted arm is mounted, a bolt carried by said frame, said bolt forming the pivot for the arm, a lateral extension on the pivoted arm, a circular way formed on the frame and engaging said extension, and means for turning the arm upon its pivot, the said extension and way holding the arm rigidly so that the cutting tool will be given its proper movement.

2. In a machine for cutting bevel gears, a cutting tool, a slide upon which said tool is carried, means for reciprocating said slide, a pivoted arm within which said slide is mounted, means for carrying the gear blank, means for producing a relative feeding movement between the cutting tool and gear blank until each tooth is completed, means for rotating the gear blank predetermined distances after each tooth on the gear is cut so as to present another part of the blank, to the action of the cutting tool, a housing upon which said pivoted arm is mounted, a bolt carried by said housing, said bolt forming the pivot for the arm, a lateral extension on the pivoted arm, a circular way formed on the housing and engaging said extension, and means for turning the arm upon its pivot, the said extension and way holding the arm rigidly so that the cutting tool will be given its proper movement.

3. In a machine for cutting bevel gears, a pair of cutting tools, a slide for each tool and upon which said tools are respectively mounted, means for reciprocating said slides, pivoted arms within which each of said slides is respectively guided, a housing upon which said arms are pivoted, a bolt carried by said housing, eye pieces on said arms through which the said bolt passes, extensions on said arm, circular ways carried by the housing and engaging said extensions, and means for turning the said arms upon their pivots, the said extensions and ways holding the arms rigidly in their position so as to properly guide the cutting tools in their movements.

4. In a machine for cutting bevel gears, a pair of cutting tools, a slide for each tool and upon which said tools are respectively mounted, means for reciprocating said slide, pivoted arms within which each of said slides is respectively guided, means for holding the gear blank and for feeding the same toward the cutting tools until each tooth is completed and for withdrawing the same from said cutting tools after the completion of such tooth, means for rotating the gear blank after such withdrawal so as to present another part of the blank to the action of the cutting tools, a housing upon which said arms are pivoted, a bolt carried by said housing, eye pieces on said arms through which the said bolt passes, extensions on said arm, circular ways carried by the housing and engaging said extensions, and means for turning the said arms upon their pivots, the said extensions and ways holding the arms rigidly in their position so as to properly guide the cutting tools in their movements.

5. In a machine for cutting gears, guide ways, a slide mounted within said guide ways, said slide having a T-slot, a member of a tool holder within said slot, a second member of said tool holder secured to the first mentioned member, a securing means for said members clamping the same together upon the slide, cheeks on the second member of the tool holder, said cheeks being provided with curved grooves on their inner faces, a rocking cradle having curved tongues at its ends projecting into said grooves, means for securing said cradle between the cheeks of the tool holder, and a tool carried by said rocking cradle.

6. In a machine for cutting gears, guide ways, a slide within said guide ways, said slide being provided with a T-slot, means for reciprocating said slide, a member of a tool holder within said T-slot, a second member of the tool holder carried by the slide, bolts securing the said members of the tool holder together, the slide and said members being so proportioned that when the bolts are tightened the members will be clamped upon the slide, cheeks projecting from the said second member, said cheeks having curved slots on their inner faces, a cradle having curved tongues adapted to fit the curved grooves in the said cheeks, whereby the cradle may be rocked upon the cheeks, means for securing the cradle in any of its adjusted positions, a pivoted plate carried by said cradle, a cutting tool carried by the pivoted plate, and means for securing said cutting tool to the plate.

7. In a machine for cutting bevel gears, a pair of pivoted arms, said arms each being provided with guide ways, slides mounted in the respective guide ways, means for reciprocating said slides, said slides being provided with T-slots, a tool carrying member in each of said slots, a second tool carrying member carried by each of said slides and bolted to the member within the slot, the said slide and tool carrying member being so constructed that when the bolts are tightened the tool holders will be securely clamped to the slides, cheeks on the said second tool carrying members, said cheeks being provided with curved grooves on their inner faces, a cradle carried by each of said second tool carrying members, said cradles having curved tongues that are adapted to fit the curved grooves of the said cheeks, means for securing the cradles in any of their adjustable positions, a plate carried by each of said cradles and pivoted thereto at one of the corners of the plate, a cutting tool carried by each of said plates, means for clamping the cutting tools to said plates, and a spring for holding the said plates in one of their positions, the construction being such that when the slides are moved in the direction to cause the tools to cut the said plates will not rock upon the cradles, but when the slides are moved in the opposite direction the said plates may move upon their cradles against the tension of the said spring.

8. In a machine for cutting bevel gears, a main frame, a cutting tool supported by said main frame, means for guiding and operating said cutting tool, a swinging table pivoted on the main frame, a stationary rack upon the main frame, said rack being concentric with the pivot of the table, a pinion carried by the table and meshing with said rack, mechanism carried by the table for rotating said pinion so as to swing the table, said mechanism including a shaft and a clutch member secured to said shaft, a pair of clutch members loosely journaled on said shaft and adapted to coöperate with the said clutch member that is secured to the shaft, means for turning said loose clutch members at different rates of speed, and automatic means carried by the table and the frame for throwing the clutch member that is secured to said shaft alternately into engagement with the said loosely driven clutch members, whereby the pinion that is in mesh with the stationary rack is caused to rotate in different directions at different rates of speed and thereby swing the table about its pivot, and means on said table for carrying the gear blank.

9. In a machine for cutting bevel gears, a main frame, a cutting tool supported by said frame, means for guiding and moving said cutting tool, a swinging table pivoted to the main frame, a stationary rack upon the main frame concentric with the pivot of the swinging table, a pivot shaft carried by the swinging table and having its axis in the pivot thereof, means for driving said pivot shaft, a pinion carried by the swinging table and meshing with the stationary rack on the main frame, a shaft journaled on the swinging table, driving connections between said shaft and the said pinion and between said shaft and the pivot shaft, a clutch member secured to the said shaft so as to be driven therewith but still be capable of longitudinal movement thereon, a pair of clutch members loosely carried by the said shaft, means connected with said pivot shaft for driving said loose clutch members in opposite directions and at different speeds, means carried by said swinging table and by the frame for automatically shifting the clutch member that is secured to said shaft alternately into driving engagement with the said loosely mounted clutch members whereby said shaft and said pinion that meshes with the stationary rack will be driven in opposite directions at different speeds and the swinging table will be moved about its pivot, and means on said swinging table for carrying the gear blank, the swinging movement of the table feeding the gear blank toward and from the cutting tool.

10. In a machine for cutting bevel gears, a main frame, a cutting tool supported by said frame, means for guiding and moving said cutting tool, a swinging table pivoted to the main frame, a stationary rack upon the main frame concentric with the pivot of the swinging table, a pivot shaft carried by the swinging table and having its axis in the pivot thereof, means for driving said pivot shaft, a pinion carried by the swinging table and meshing with the stationary rack on the main frame, a shaft journaled on the swinging table, driving connections between said shaft and the said pinion, and between said shaft and the pivot shaft, a clutch member secured to the said shaft so as to be driven therewith but still be capable of longitudinal movement thereon, a pair of clutch members loosely carried by the said shaft, means connected with said pivot shaft for driving said loose clutch member in opposite directions and at different speeds, means carried by said swinging table and by the frame for automatically shifting the clutch member that is secured to said shaft alternately into driving engagement with the said loosely mounted clutch members whereby said shaft and said pinion that meshes with the stationary rack will be driven in opposite directions at different speeds, and the swinging table will be moved about its pivot, means on said swinging table for carrying the gear blank, the swinging movement of the table feeding the gear blank toward and from the cutting tool, and means for securing lost motion in the mechanism for moving the table away from the cutting tool, said device comprising a gear having an extended hub with a clutch face at the end of the hub, a second gear mounted upon the hub of the first gear and adapted to travel a predetermined distance upon the hub before the table is reversed.

11. In a machine for cutting gears, a shaft, a pair of corresponding clutch members carried by said shaft, one of said members being loose on the shaft, and the other member being secured to the shaft so as to turn therewith but be capable of longitudinal movement thereon, a shifting lever for moving one of said clutch members into and out of driving relation with the other clutch member, a pair of toggle levers coöperating with the said shifting lever, and a spring tending to cause said toggle levers to break, the construction being such that when the shifting lever is moved in one direction the toggle levers will be broken in that direction so as to throw the clutch members quickly into driving engagement, and when the shifting lever is moved in the opposite direction the toggle levers will also break in that direction and quickly disengage the clutch members.

12. In a machine for cutting gears, a shaft, a pair of clutch members loosely mounted on said shaft, and a coöperating clutch member secured to the shaft so as to turn therewith but be capable of longitudinal movement thereon, the latter member being located between the loose clutch members, a shifting lever for moving the said coöperating clutch member into and out of driving relation with the other clutch members, a pair of toggle levers coöperating with the said shifting lever, a spring tending to cause said toggle levers to break, the construction being such that when the shifting lever is moved in one direction the toggle levers will be broken in that direction so as to throw the coöperating clutch member quickly into driving engagement with one of the loose members, and when the shifting lever is moved in the opposite direction the toggle levers will also break in that direction so as to throw the said coöperating clutch member quickly into engagement with the other loose member.

13. In a machine for cutting gears, a main frame, a cutting tool and means for supporting and operating the same, a swinging table pivoted on said frame, a stationary rack mounted on the frame concentric with the pivot of the table, a pinion carried by the table and meshing with the said rack, a shaft carried by the table, gearing connecting the said shaft and the pinion, a clutch member secured to said shaft so as to turn therewith but be capable of longitudinal movement thereon, a pair of clutch members loosely mounted on said shaft on opposite sides of the first-mentioned clutch member, means for driving said loosely mounted clutch members in opposite directions and at different speeds, a shifting lever engaging with the clutch member that is secured to the shaft and being adapted to throw said clutch member into driving engagement with either one or the other of the loosely mounted clutch members, said shifting lever having a forked extension, means on said frame and table for automatically throwing said shifting lever, a pair of toggle levers extending between the forks of the extension of the shifting lever and coöperating therewith, and a spring on said toggle levers tending to cause the latter to break, the construction being such that as the shifting lever is started to move in one direction from its central position the toggle levers will break in that direction and will throw the shifting lever quickly and thereby connect the driven clutch member with one of the loosely mounted clutch members.

14. In a machine for cutting bevel gears, a main frame, a cutting tool supported by said main frame, means for operating the cutting tool, a swinging table pivoted to said frame, a stationary rack on the main frame, said rack being concentric with the pivot of the table, a pinion carried by said swinging table and meshing with the said rack, whereby as the pinion is turned the table will be swung about its pivot on the main frame, a shaft journaled in the table, gearing connecting said shaft with the said pinion, a driven clutch member keyed to said shaft but being capable of longitudinal movement thereon, a pair of driving clutch members loosely mounted on said shaft on opposite sides of the driven clutch member, means for turning the driving clutch members in opposite directions and at different speeds, a shifting lever for throwing the driven clutch member into engagement with either one of the driving clutch members, said shifting lever having a forked extension, means carried by the main frame and by the table for automatically throwing the shifting lever after the table has moved predetermined distances in either direction, a pair of toggle levers between the forks of the extension of the shifting lever, means for yieldingly holding the toggle levers in their straight line position, and a spring for breaking the toggle levers in either direction after the same have been moved in that direction from their straight line position, the construction being such that when the swinging table has moved in one direction its predetermined distance the shifting lever will be thrown so as to unclutch the driven and a driving clutch member, and when the toggle lever is carried beyond its straight line position it will suddenly break and throw the shifting lever so as to quickly carry the driven clutch member into engagement with the opposite driving clutch member, whereby the direction of motion of the swinging table is reversed.

15. In a machine for cutting bevel gears, a main frame, a swinging table pivoted to said frame, a stationary rack on said frame, said rack being concentric with the pivot of the table, a pinion carried by the table and meshing with the rack, a shaft journaled on said table, gearing connecting said shaft and said pinion, a driven clutch member secured to said shaft but capable of longitudinal movement thereon, a pair of driving clutch members loosely mounted on the shaft on opposite sides of the driven clutch member, adjustable stops on the main frame, means carried by the swinging table and coöperating with said stops for shifting the driven clutch member out of engagement with one of the driven clutch members and into engagement with the opposite member, whereby the direction of motion of the swinging table is reversed, and a lost motion device connected with the reversing mechanism for the table, said device comprising a gear having an extended hub with a clutch face at the end of the hub, a second gear mounted upon the hub of the first gear and adapted to travel a predetermined distance upon the hub before the table is reversed.

16. In a machine for cutting bevel gears, a main frame, a swinging table pivoted to said frame, a stationary rack carried by the frame and concentric with the pivot of the table, a pinion carried by the table and meshing with the said rack, a shaft journaled on the table, gearing connecting said shaft and pinion, a driven clutch member secured to the shaft, a pair of driving clutch members loosely mounted on the shaft, means on the table for carrying a gear blank, a cutting tool for cutting teeth on the gear blank, means for engaging the driven clutch member with one of the driving clutch members so as to move the table to carry the gear blank toward the cutting tool, means for varying the speed with which the said driving clutch member is driven, and means for driving the other driving clutch member and for shifting the driven clutch member into engagement therewith, whereby the swinging table is returned.

17. In a machine for cutting bevel gears, a main frame, a swinging table pivoted to said frame, a stationary rack carried by the frame and concentric with the pivot of the table, a pinion carried by the table and meshing with the said rack, a shaft journaled on the table, gearing connecting said shaft and pinion, a driven clutch member secured to the shaft, a pair of driving clutch members loosely mounted on the shaft, means on the table for carrying a gear blank, a cutting tool for cutting teeth on the gear blank, means for engaging the driven clutch member with one of the driving clutch members so as to move the table to carry the gear blank toward the cutting tool, means for varying the speed with which the said driving clutch member is driven, means for driving the other driving clutch member and for shifting the driven clutch member into engagement therewith, whereby the swinging table is returned, and a lost motion device connected with the clutch member for returning the table, said device comprising a gear having an extended hub with a clutch face at the end of the hub, a second gear mounted upon the hub of the first gear and adapted to travel a predetermined distance upon the hub before the table is reversed.

18. In a machine for cutting bevel gears, a main frame, a cutting tool supported by said frame, means for operating said cutting tool, a swinging table pivoted upon the main frame, means on said table for supporting a gear blank in position to be operated upon by the cutting tool, a rack on the main frame and curved concentrically with the pivot of the table, a pinion carried by the table and engaging with the rack, a shaft upon which said pinion is secured, a worm wheel on said shaft, a shaft journaled in the table, a worm on said shaft engaging with the said worm wheel, a main drive shaft also journaled upon said table, connections between the two last-mentioned shafts for driving the pinion and for swinging the table toward the cutting tool, means for varying the speed with which the table is moved in this direction, connections between the said main drive shaft and the shaft carrying the worm for driving the pinion and for swinging the table in the opposite direction at a high rate of speed, and means for automatically reversing the direction of motion of the table after it has been moved in either direction a predetermined distance.

19. In a machine for cutting bevel gears, a main frame, a cutting tool supported by said frame, means for operating said cutting tool, a swinging table pivoted upon the main frame, means on said table for supporting a gear blank in position to be operated upon by the cutting tool, a rack on the main frame and curved concentrically with the pivot of the table, a pinion carried by the table and engaging with the rack, a shaft upon which said pinion is secured, a worm wheel on said shaft, a shaft journaled in the table, a worm on said shaft engaging with the said worm wheel, a main drive shaft also journaled upon said table, connections between the two last-mentioned shafts for driving the pinion and for swinging the table toward the cutting tool, means for varying the speed with which the table is moved in this direction, connections between the said main drive shaft and the shaft carrying the worm for driving the pinion and for swinging the table in the opposite direction at a high rate of speed, means for automatically reversing the direction of motion of the table after it has been moved in either direction a predetermined distance, and a lost-motion device connected with the means for swinging the table away from the cutting tool, said device comprising a gear having an extended hub with a clutch face at the end of the hub, a second gear mounted upon the hub of the first gear and adapted to travel a predetermined distance upon the hub before the table is reversed.

20. In a machine for cutting bevel gears, a main frame, a cutting tool supported by the main frame, means for operating said cutting tool, a swinging table carried by the main frame, a stationary rack on the main frame concentric with the pivot of the swinging table, a pinion carried by the swinging table, means for turning said pinion in one direction so as to move the table toward the cutting tool, means for moving said pinion in the opposite direction so as to move the table away from the cutting tool, automatic devices for changing the direction of movement of said pinion, a mandrel carried by the table for supporting the gear blank, a shaft journaled in the table, a friction clutch and gear carried by said shaft, connections between said gear and the said mandrel for turning the mandrel when the said shaft is turned, means for positively locking the said gear against rotation, and means connected with the reversing mechanism for the pinion for releasing said gear and for permitting the same to have a limited movement whereby the gear blank is turned so as to present a fresh surface to the cutting tool.

21. In a machine for cutting bevel gears, a main frame, a cutting tool supported by the main frame, means for operating said cutting tool, a swinging table carried by the main frame, a stationary rack on the main frame concentric with the pivot of the swinging table, means for turning said pinion swinging table, means for turning said pinion in one direction so as to move the table toward the cutting tool, means for moving said pinion in the opposite direction at a faster speed, so as to return the table quickly from the cutting tool, automatic devices for changing the direction of movement of said pinion, a lost-motion device in the means for returning the table, said device comprising a gear having an extended hub with a clutch face at the end of the hub, a second gear mounted upon the hub of the first gear and adapted to travel a predetermined distance upon the hub before the table is reversed, a mandrel carried by the table for supporting the gear blank, a shaft journaled in the table, a friction clutch and gear carried by said shaft, connections between said gear and the said mandrel for turning the mandrel when the said shaft is turned, means for positively locking the said gear against rotation, and means connected with the reversing mechanism for the pinion for releasing said gear and for permitting the same to have a limited movement whereby the gear blank is turned so as to present a fresh surface to the cutting tool.

22. In a machine for cutting bevel gears, a main frame, a cutting tool supported by said frame, means for operating said cutting tool, a swinging table pivoted to the main frame, a stationary rack on the main frame, said rack being concentric with the pivot of the table, a pinion carried by the table and meshing with the said rack, a shaft journaled in the table, gearing connecting the pinion and said shaft, a driven clutch member secured to said shaft, a pair of driving clutch members, means for turning said driving clutch members in opposite directions, a shifting lever for throwing the driven clutch members, a mandrel shaft journaled on the table, said mandrel shaft carrying the gear blank, means for turning the mandrel shaft, said means including a gear and a friction device for driving said gear, means for positively locking the gear against rotation, and means controlled by the clutch shifting lever for releasing the said gear, whereby the same may rotate with the friction device to turn the gear blank so as to present a fresh surface to the action of the cutting tool.

23. In a gear cutting machine, a cutting tool, means for holding the gear blank to be cut, means for producing a relative feeding movement between the tool and the gear blank, means for separating the tool and the gear blank after a tooth has been completed, said means including a positively driven gear, a clutch member upon which said gear is threaded so that the gear may have lateral movement on said member, a gear secured to the clutch member, independent pinions meshing with the respective gears, a friction device between said pinions, and means for automatically throwing the said clutch member into operation, the construction being such that after the clutch member is thrown into operation the gear thereon must travel upon the threads of the clutch member to a definite extent before the said clutch member will be moved to start the separation of the tool and the gear blank.

24. In a gear cutting machine, a cutting tool, means for holding the gear blank to be cut, means for feeding the gear blank toward the cutting tool, means for moving the gear blank away from the tool after the tooth has been completed, said means including a positively driven gear, a clutch member upon which said gear is threaded so that the gear may have lateral movement on said member, a gear secured to the clutch member, said gears being of different diameters, independent pinions meshing with the respective gears, said pinions being of different diameters, a friction device between said pinions, and means for automatically throwing the said clutch member into operation, the construction being such that after the clutch member is thrown into operation the gear thereon must travel upon the threads of the clutch member to a definite extent before the said clutch member will be moved to start the separation of the tool and the gear blank, and when the clutch member is thrown out of operation the gear thereon will travel on the clutch member to its original position.

25. In a gear cutting machine, a main frame, a cutting tool supported upon said main frame, means for moving said cutting tool for producing the cutting operation, a swinging table pivoted upon the main frame, a shaft journaled on said table, a rack carried by the frame and curved concentrically with the pivot for the table, a pinion carried by the table and meshing with the said rack, a driven clutch member carried by the said shaft so as to turn therewith but have lateral movement thereon, a pair of driving clutch members loosely mounted upon the shaft on opposite sides of the driven clutch member, means for turning said driving clutch members in opposite directions and at different speeds, means for shifting the driven clutch member into engagement with either of the driving clutch members whereby the said pinion on the table will cause the swinging table to move toward and from the cutting tool, a gear screw threaded upon the driving clutch member having the highest rate of speed, a second gear secured to the latter clutch member, a pair of independent pinions meshing with said gears, a friction device between said pinions and tending to drive the same together, and means for automatically shifting the driven clutch member after the swinging table has been moved in either direction a predetermined distance, the construction being such that when the driven clutch member is shifted into mesh with the more rapidly moving driving clutch member, the gear that is screwthreaded thereto will travel upon the clutch member a predetermined distance before the table will be moved away from the cutting tool.

26. In a gear cutting machine, a main frame, a cutting tool supported upon said main frame, means for moving said cutting tool for producing the cutting operation, a swinging table pivoted upon the main frame, a shaft journaled on said table, a rack carried by the frame and curved concentrically with the pivot for the table, a pinion carried by the table and meshing with the said rack, a driven clutch member carried by the said shaft so as to turn therewith but have lateral movement thereon, a pair of driving clutch members loosely mounted upon the shaft on opposite sides of the driven clutch member, means for turning said driving clutch members in opposite directions and at different speeds, means for shifting the driven clutch member into engagement with either of the driving clutch members whereby the said pinion on the table will cause the swinging table to move toward and from the cutting tool, a gear screw threaded upon the driving clutch member having the highest rate of speed, a second gear secured to the latter clutch member, said gears being of different diameters, a pair of independent pinions meshing with said gears, a friction device between said pinions and tending to drive the same together, and means for automatically shifting the driven clutch member after the swinging table has been moved in either direction a predetermined distance, the construction being such that when the driven clutch member is shifted into mesh with the more rapidly moving driving clutch member, the gear that is screwthreaded thereto will travel upon the clutch member a predetermined distance before the table will be moved away from the cutting tool, and when the driven clutch member is thrown into engagement with the slowly moving driving clutch member, the gear on the other driving clutch member, will travel thereon back to its original position.

27. In a machine for cutting bevel gears, a main frame, a cutting tool carried by said frame, means for reciprocating said cutting tool, a table pivoted upon the main frame, said table carrying the gear blank to be cut, a rack carried by the main frame, said rack being curved concentrically with the pivot of the table, a pinion carried by the table and meshing with said rack, gearing for turning the pinion in one direction for moving the table and the gear blank toward the cutting tool, gearing for turning said pinion in the opposite direction at an increased speed, whereby the gear blank may be moved quickly away from the cutting tool, a shifting lever for reversing the direction of motion of the table after the same has moved in either direction a predetermined distance, means for turning the gear blank a predetermined distance after each tooth has been cut, said means including a gear, friction devices engaging said gear for turning the same, a locking rod engaging the said gear and normally holding the same from turning, a spring for forcing said rod into engagement with the said gear, a hook on said rod, a pawl carried by the shifting lever and adapted to engage the hook on the locking rod, and a stop for automatically disengaging the pawl from the said hook, the construction being such that when the shifting lever is moved in a direction to move the table away from the cutting tool said pawl will engage the hook, and when the shifting lever is moved in the opposite direction to swing the table toward the cutting tool, the hook will disengage the locking rod from the said gear so that the gear blank may be turned, and the stop will then release the pawl from the hook so that the gear may again be engaged.

28. In a machine for cutting gears, a cutting tool, means for carrying the gear blank to be cut, means for producing a relative feeding movement between the gear blank and the cutting tool, a rack bar secured to the part that has the feeding movement, a rock shaft, means for rocking said shaft from said rack bar, one or more templets carried by said shaft and connections between said templet or templets and the cutting tool, the construction being such that during the feeding movement the tool will be moved laterally to give the proper shape to the tooth.

29. In a machine for cutting bevel gears, a cutting tool, means for operating said cutting tool, a swinging table for supporting the gear blank to be cut, a rack bar secured to said swinging table, a rock shaft carrying said templet, one or more templets, connection between said rack bar and the said templet or templets for moving the latter as the swinging table moves the gear blank toward the cutting tool, and connections between the templet and the cutting tool whereby as the gear blank is moved toward the cutting tool said tool will be moved laterally to produce the proper shape of tooth.

30. In a machine for cutting bevel gears, a pair of cutting tools, means for reciprocating said cutting tools together, pivoted arms within which said cutting tools are mounted for reciprocation, a pivoted table, means for swinging said table about its pivot, means on said table for supporting the gear blank that is to be cut, means for automatically reversing the direction of the motion of the table after it has been moved in either direction to a predetermined extent, a rack bar secured to the swinging table, a rock shaft carrying a templet, connections between the templet mechanism and the rack bar, whereby the said mechanism will be operated as the table is moved, and means connecting the templet mechanism with the pivoted arms carrying the cutting tools, the construction being such that as the gear blank is fed toward the cutting tools said tools will be gradually separated so as to produce the proper shape of gear tooth.

31. In a machine for cutting bevel gears, a pair of cutting tools, means for reciprocating said cutting tools together, pivoted arms within which said cutting tools are mounted for reciprocation, a pivoted table, means for swinging said table about its pivot, means on said table for supporting the gear blank that is to be cut, means for automatically reversing the direction of motion of table after it has been moved in either direction to a predetermined extent, a rack bar secured to the swinging table, a rock shaft, connections between the rack bar and the rock shaft for turning the latter as the table is swung, and templet plates secured to said rock shaft and coöperating with the pivoted arms carrying the cutting tools, the construction being such that as the gear blank is fed toward the cutting tools said tools will be gradually separated so as to produce the proper shape of gear tooth.

32. In a machine for cutting bevel gears, a main frame, a cutting tool supported by the main frame, means for reciprocating said cutting tool, a swinging table pivoted on the main frame, means on the swinging table for supporting the gear blank to be cut, means for swinging said table on its pivot so as to carry the gear blank toward and from the cutting tool, a curved bar, a rack on said bar, clamping devices carried by the swinging table and engaging with said bar so as to adjustably secure the bar to the swinging table, a rock shaft carrying a templet mechanism operated by said rack and connections between the templet mechanism and the cutting tool whereby as the table is swung toward the cutting tool the latter will be moved laterally to produce the proper shape of gear tooth.

33. In a machine for cutting bevel gears, a main frame, a pair of swinging arms pivoted together and supported by the main frame, a cutting tool mounted for reciprocation in each of said pivoted arms, means for reciprocating said cutting tools, a mandrel shaft carrying the gear to be cut, said mandrel shaft being in the same plane with the pivot of the said arms, means for moving said mandrel shaft longitudinally, a pin adapted to be inserted through the pivot of said arms, the end of the pin, when fully inserted, serving as a guide for determining the proper position of the blank with reference to the cutting tools, and means for gradually turning the arms upon their pivot as the operation on the gear tooth progresses, whereby the proper shape is given to the tooth.

In testimony whereof, I hereunto affix my signature in the presence of two witnesses.

EARL H. BROWNING.

Witnesses:
W. L. McGarrell,
J. B. Hull.